Jan. 2, 1962 C. E. McKEON ETAL 3,015,199
MACHINE FOR COMPRESSING HAY INTO CAKES
Filed April 8, 1959 7 Sheets-Sheet 6
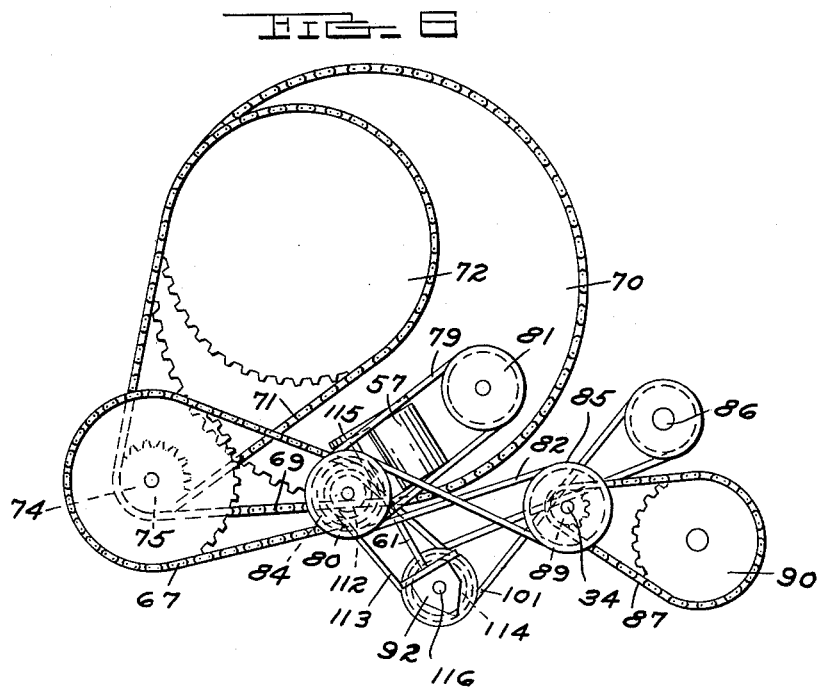
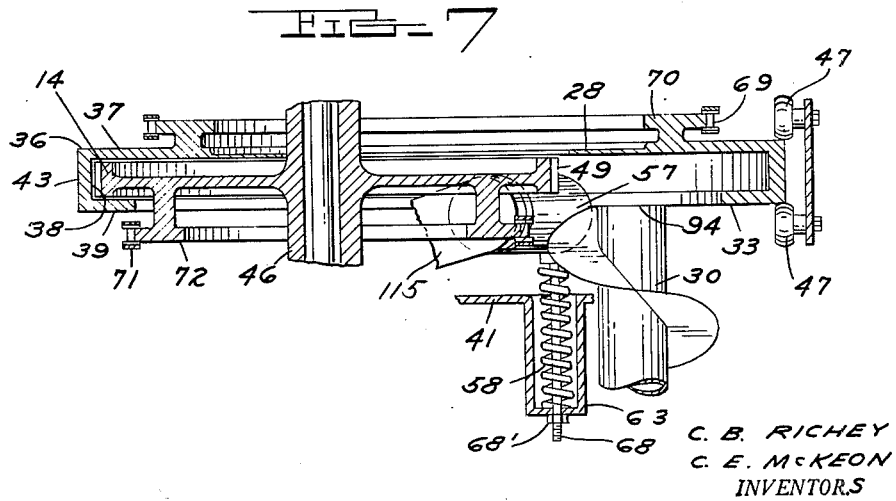
C. B. RICHEY
C. E. McKEON
INVENTORS
BY
J. R. FAULKNER
P. F. HILDER
ATTORNEYS

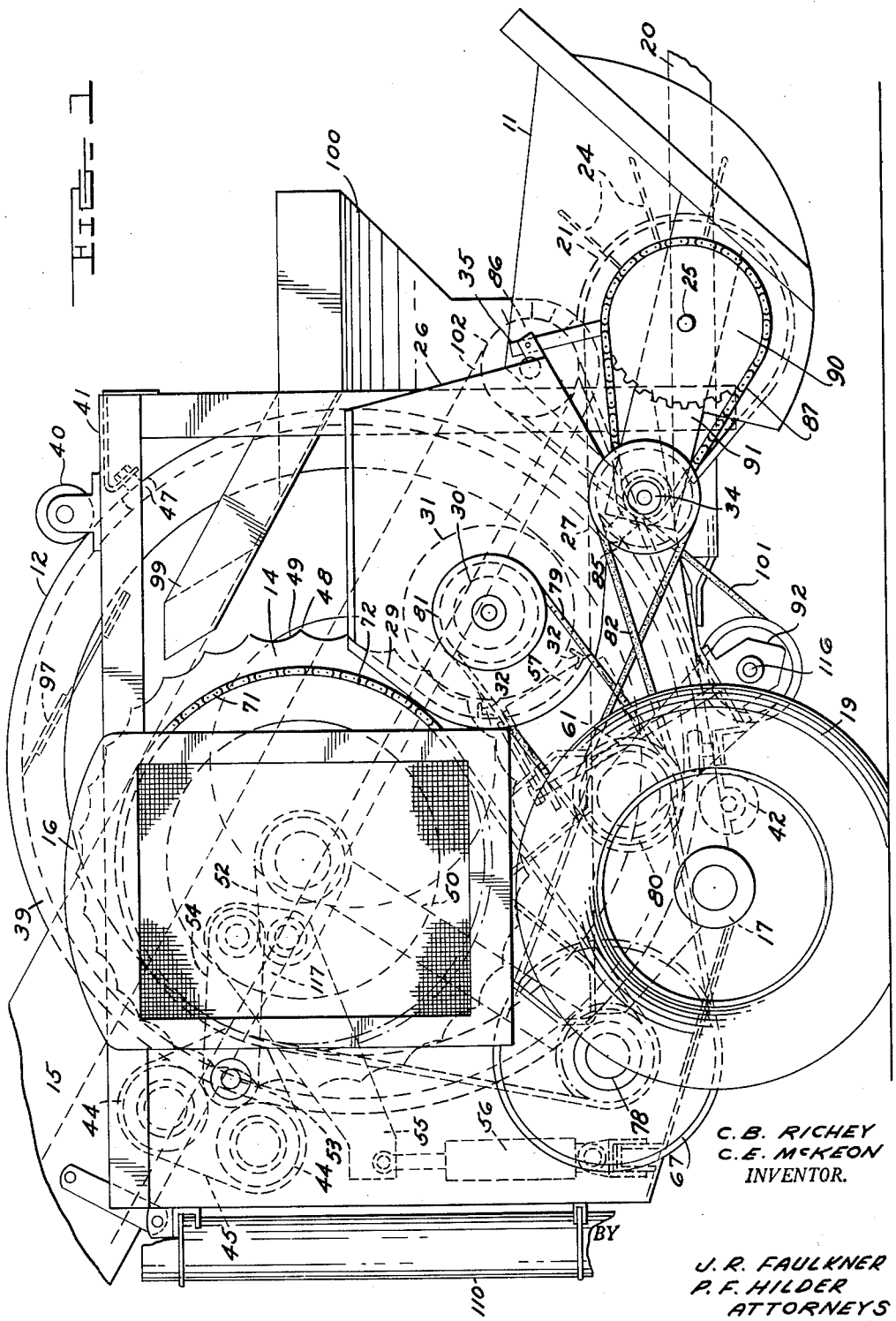

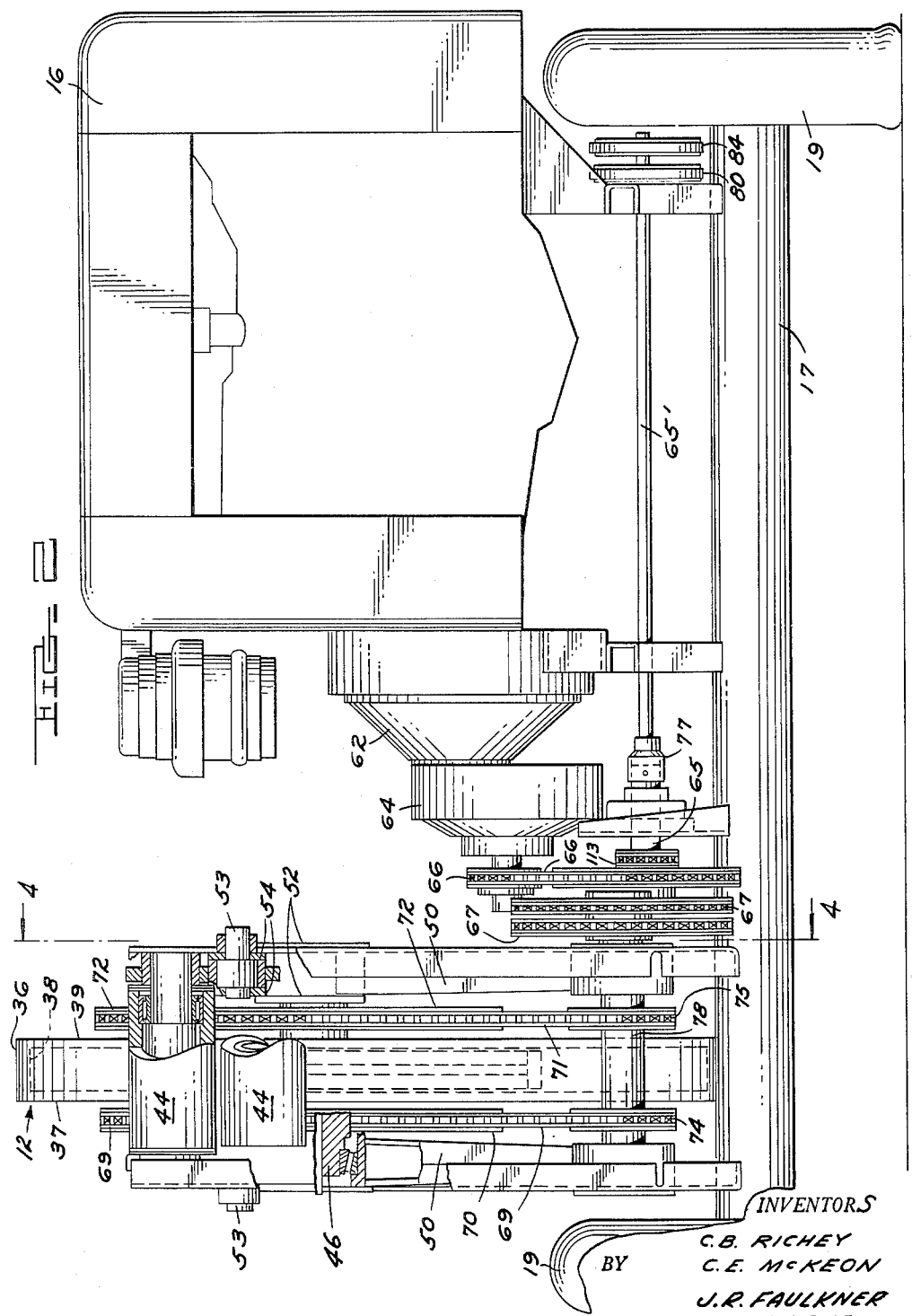

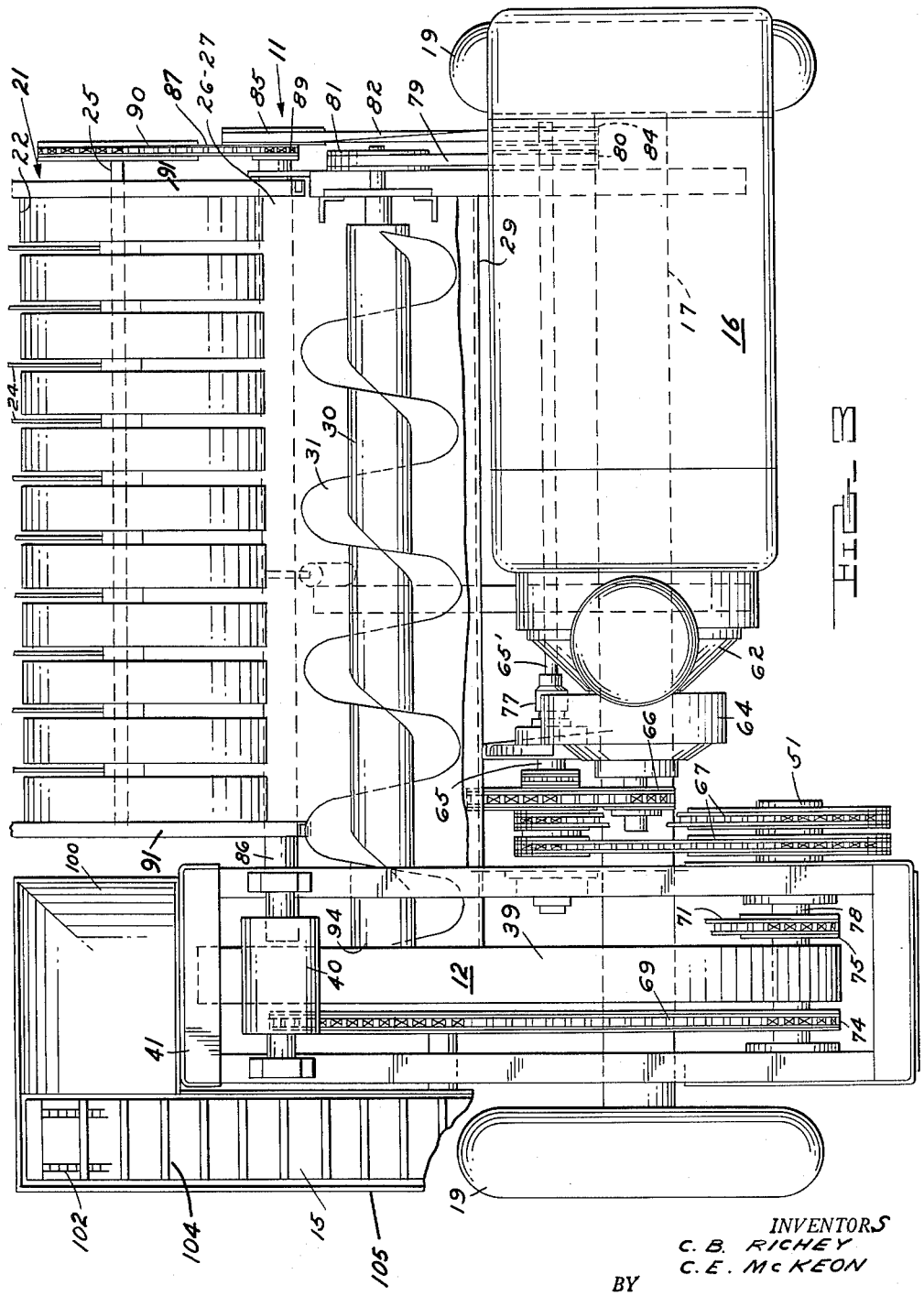

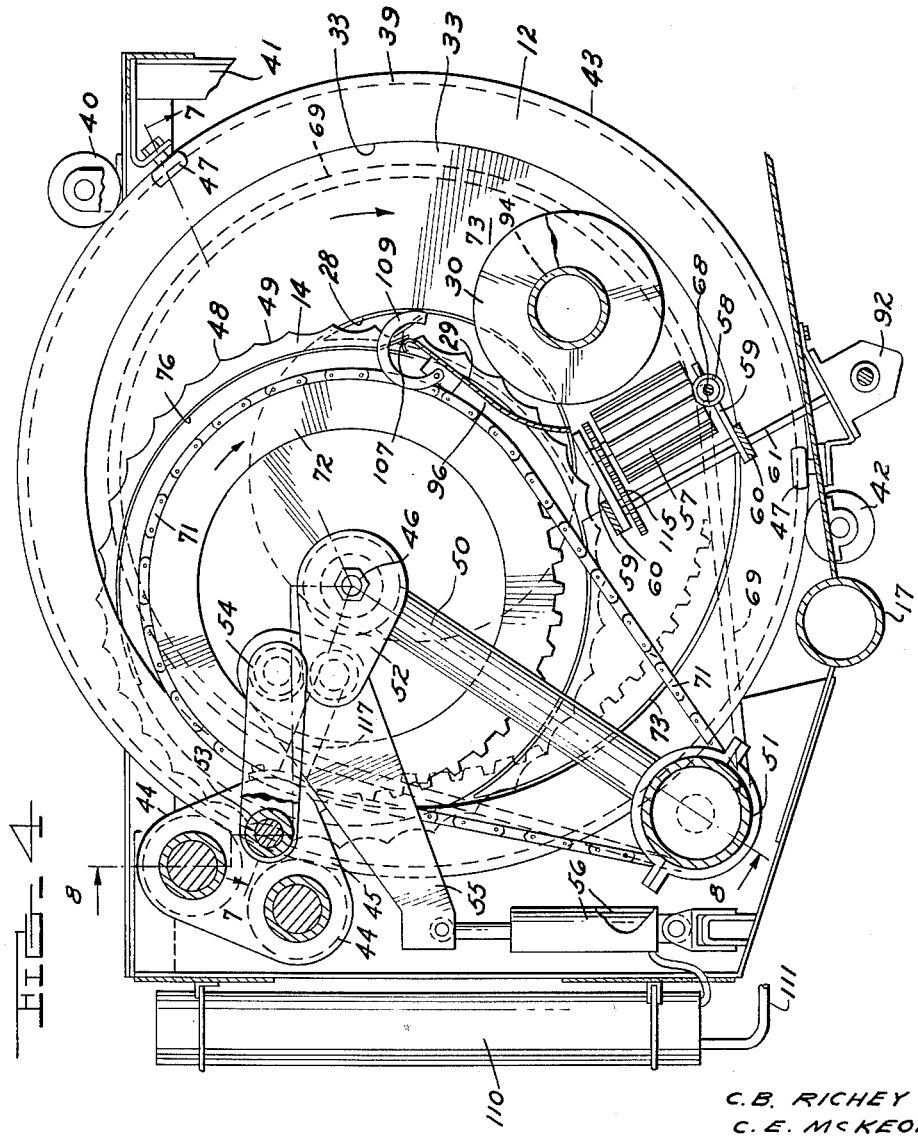

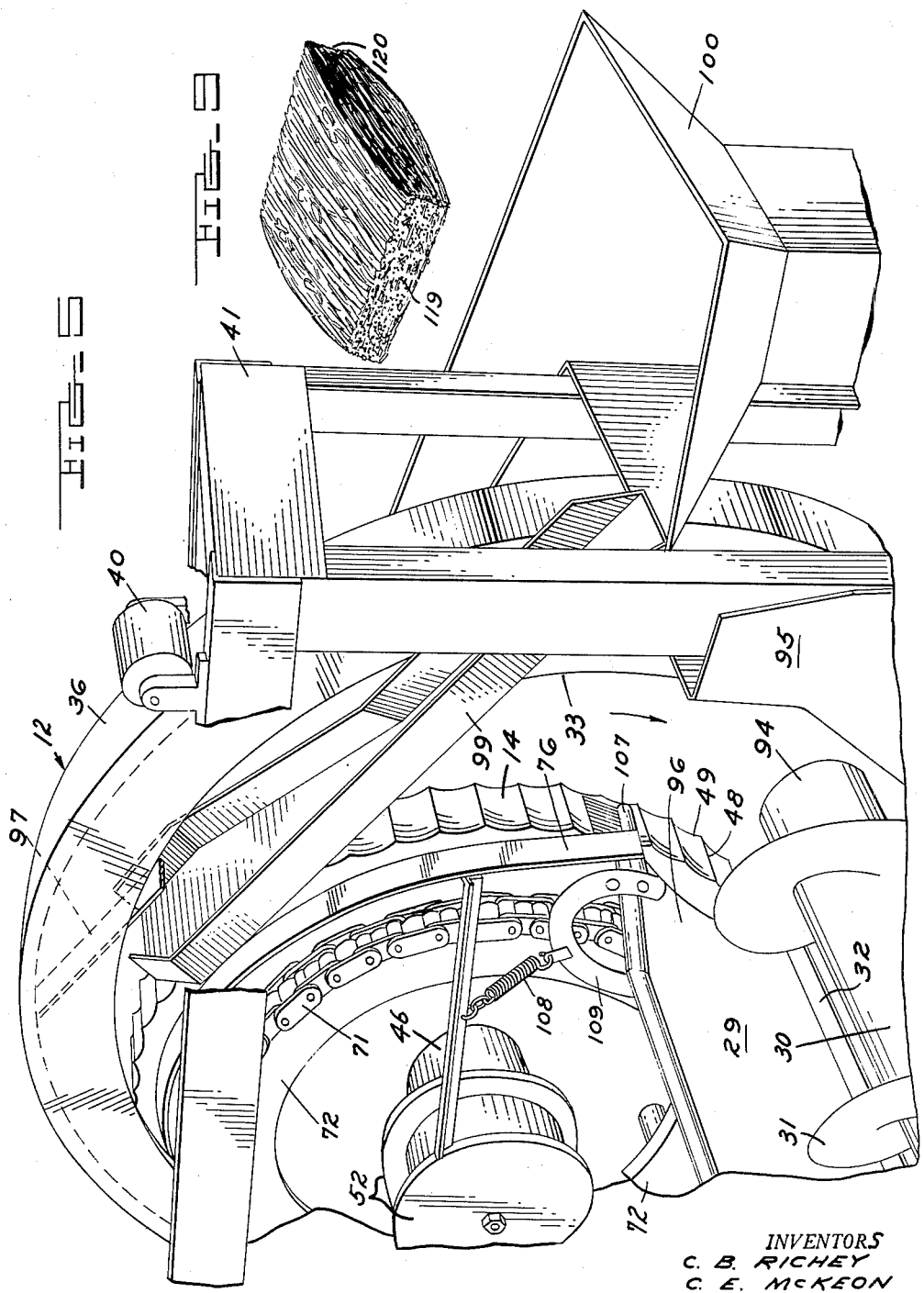

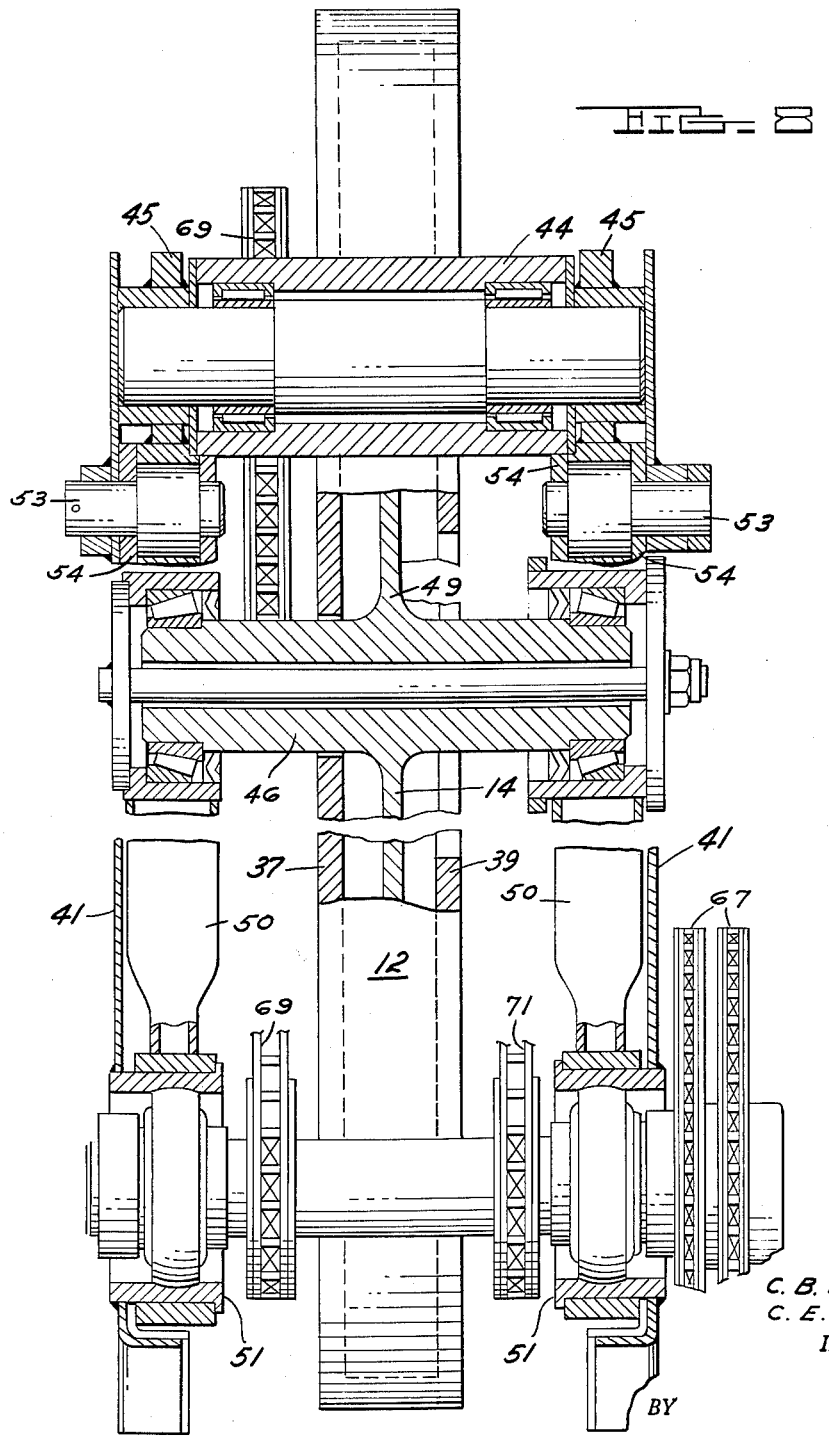

United States Patent Office 3,015,199
Patented Jan. 2, 1962

3,015,199
MACHINE FOR COMPRESSING HAY INTO CAKES
Charles E. McKeon, Birmingham, and Clarence B. Richey,
Royal Oak, Mich., assignors to Ford Motor Company,
Dearborn, Mich., a corporation of Delaware
Filed Apr. 8, 1959, Ser. No. 804,988
12 Claims. (Cl. 56—1)

This invention relates to a machine for the field pelleting of hay, including grasses, alfalfa, clover and the like.

This invention is directed to a machine for picking up hay that has previously been cut and permitted to dry in the field, condensing the hay and subjecting it to high pressure to form small, individual cakes or pellets of hay which are self sustaining after the pressure is removed so as to be capable of being handled with little or no disintegration. The individual pellets are of such size that they can be handled conveniently by power conveyors and can be picked up and chewed individually by cattle.

The present invention comprises a machine by which the hay is picked up from the field, usually in the form of a windrow, and passed through the machine in a continuous stream as the machine is moved across the field, the hay being fed by the pickup portion of the machine into the pelleting portion and between a pair of hay pelleting wheels which highly compress the hay and at the same time separate or pinch off the hay into individual pellets, after which the pellets are extracted from one of the wheels, collected and conducted by an elevator into a trailed wagon.

Among the features of the present machine is the relationship of the diameters of the two wheels and the positioning of one of the pelleting wheels inside the other pelleting wheel, both wheels rotating on generally fixed axes, the axis of the inner wheel being offset from the axis of the outer wheel and the wheels being generally tangent in a pelleting zone whereby the hay may be fed between the wheels and compressed into pellets or cakes. Other features of the present machine are an improved pickup which feeds the hay axially into the space between the pelleting wheels and an improved feed mechanism for guiding the hay towards the converged portion between the wheels.

Among the objects of the present invention is to provide an improved hay pelleting mechanism in which the pelleting wheels are arranged so that the pelleting surfaces of the wheels converge and diverge gradually over an extended periphery of the wheels in order to maintain pressure on the pellets during a greater angular travel of the wheels, and to avoid distortion of the compressed pellet as the wheels part, to provide such a machine in which the hay is fed laterally from a hay pickup and in a direction axially of the wheels to a position between the wheels, and to provide an improved feed method for feeding the hay between the wheels and through the pelleting zone.

Other objects, and objects relating to details and economies of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 1 is a side elevation of a hay pelleter constructed according to the present invention, portions of the drawbar, hydraulic accumulator and wagon elevator being broken away for convenience of illustration;

FIGURE 2 is a rear elevation of the machine of FIGURE 1, portions of the machine being broken away or shown in vertical section and the wagon elevator and associated mechanism being omitted;

FIGURE 3 is a top plan view of the machine of FIGURES 1 and 2, certain portions of the machine, including the drawbar and wagon elevator, being omitted or broken away for convenience of illustration;

FIGURE 4 is a vertical longitudinal section of the machine, taken generally along the line 4—4 of FIGURE 2;

FIGURE 5 is a perspective view of the machine, showing portions of the pelleting wheels, feed mechanism, wagon elevator and associated mechanism;

FIGURE 6 is a diagrammatic side elevation showing the pelleting wheels and feed mechanism and the mechanical drives therefor;

FIGURE 7 is a transverse section through the pelleting wheels, taken generally along the line 7—7 of FIGURE 4;

FIGURE 8 is a transverse section through the pelleting wheels, taken generally along the line 8—8 of FIGURE 4; and FIGURE 9 is a somewhat diagrammatic perspective view of an enlarged pellet produced by the machine of the present invention.

Referring now to the drawings, the machine of the present invention includes a pickup attachment 11 for picking up the hay from the ground, preferably in the form of a windrow, a pair of opposed large and small pelleting wheels 12 and 14 for compressing and forming the hay into self-sustaining pellets, and a wagon elevator 15 for receiving the pellets, elevating them, and dropping them into a wagon towed behind the machine. The pickup 11, pelleting wheels 12 and 14 and the wagon elevator 15 are driven by an engine 16, all of these being supported by a frame 17 provided with a pair of supporting ground wheels 19—19. The pelleting machine may be towed behind a tractor by means of a more or less conventional forwardly extending tongue 20.

*The pickup*

The pickup 11 includes a more or less conventional pickup cylinder 21 of the type in which a series of arcuate, spaced, stationary stripper elements 22 are located at the forward portion of the header and spring tines 24 are carried by a central shaft 25, the shaft 25 being driven in a direction to cause the tines to move upwardly between the stripper elements at the front of the pickup cylinder so as to raise a windrow in a conventional manner onto a horizontal, laterally extending feed table 26 immediately behind the pickup cylinder 21.

The feed table 26 has a laterally extending horizontal surface portion 27 and an upwardly extending rear wall 29. A feed auger 30 extends above the portion 27 and is provided with a spiral flight 31 extending for the length of the auger, the left-hand end of the auger being unsupported so as to permit the crop to be fed to the left as viewed in FIGURE 3. Preferably, the rear wall 29 of the feed table 26 curves forwardly at the top as indicated in the drawings to provide a more or less concave wall following the general contour of the outer diameter of the auger. If desired, one or more angles 32 may be provided extending lengthwise of the feed table 26 to retard rotation of the crop with the auger and confine movement of the crop more or less to movement to the left along the feed table.

The pickup cylinder 21 is pivotally mounted on the axis of a stationary shaft 34 for raising and lowering movement in a customary manner. For transport, the pickup cylinder 21 is carried in raised position in which the lower portion of the cylinder is raised from the ground. While in operating position, the cylinder is supported by an adjustable strap 35.

Pelleting mechanism

The pelleting wheels 12 and 14 rotate on horizontal, transversely extending axes (extending at right angles to the path of the pelleter across the field) and are positioned with one side of the wheels adjacent the left end of the auger 30. The large pelleting wheel 12 is provided with a circular rim 36 and a pair of flat, radially inwardly projecting flanges 37 and 39, the rim 36 having a smooth, cylindrical inner surface 38. Both flanges 37 and 39 have an axially located circular hole or opening, the opening 28 in the outside flange 37 (flange away from the auger 30) being somewhat smaller than the opening 33 in the flange 39 for a reason to be explained. The outer surface 43 of the rim 36 of the large pelleting wheel preferably is smooth and cylindrical.

Preferably, the ratio of the diameters of the large and small pelleting wheels is about 1.5:1 in order to compress the hay more gradually over a greater distance as it approaches the pelleting zone, and to relieve the pressure on the pelleted hay gradually as it leaves the pelleting zone. With the extreme diameter of the inner pelleting wheel about 32" and of the confronting surface of the outer wheel about 48", the space between the peripheries of the two wheels in the zone diametrically opposite the pelleting zone will be sufficient to introduce the hay between the two wheels and to remove the pellets from the outer wheel. The ratio of the diameters of the wheels may be as high as 2:1, particularly if the outer wheel is made larger than 48" in diameter. The ratio may be lower than 1.5:1, provided only that sufficient space is left diametrically opposite the pelleting zone or introduction of hay between the peripheries of the wheels.

The large pelleting wheel 12 is not carried on an axle, but is supported for rotation on a fixed axis by a series of peripheral rollers engaging the surface 43. This series of rollers includes a cylindrical roller 40 carried on antifriction bearings supported from an upright portion 41 of the frame 17 and a second roller 42 similar to the roller 40, also carried on the frame portion 41 and spaced about 120° along the periphery of the large pelleting wheel 12. In addition, a pair of peripheral rolls 44, 44 are supported by a carrier 45 located about equidistant from the rolls 40 and 42 along the periphery of the wheel 12, the carrier being free to rotate about an axis 46 to permit both rolls 44 to bear against the periphery of the pelleting wheel 12 with equal pressure. The carrier 45 is located adjacent the pelleting zone, at which pelleting of the hay occurs.

The pelleting wheel 12 is supported against lateral movement adjacent the rolls 40 and 42 by pairs of spaced side rolls 47, 47 supported from the frame portion 41, the side rolls 47 bearing one against the outside surface of the radial flange 37 and the other against the outside surface of the radial flange 39 to confine the pelleting wheel against side movement. The pelleting wheel is confined against side movement adjacent the rolls 44 by engagement of the small pelleting wheel 14 between the flanges 37 and 39, as will be explained.

The small pelleting wheel 14 is mounted inside of and in the plane of wheel 12, and is provided with a scalloped or pocketed outer peripheral or rim surface 49 confronting the inner surface 38 of the rim 36 of the outer pelleting wheel. Preferably, the individual pockets of the peripheral surface 49 each are formed of a cylindrical surface having its axis extending parallel to the axis of the pelleting wheel, the pockets extending for the full width of the surface 49. Intersections of surfaces of adjacent pockets form wedge-like, axially extending portions 48 about the periphery of the wheel. The axial extent of the peripheral surface 49 of the pelleting wheel 14 is such that there is only a running clearance between the wheel 14 and the inner surfaces of the flanges 37 and 39 of the large wheel 12.

The axis 46 of the small pelleting wheel 14 is carried on a pair of arms 50, 50 which are rotatably supported for limited oscillatory movement on axially aligned cylindrical portions 51, 51 supported by the portion 41 of the frame 17. The arms 50, 50 extend upwardly from the portions 51, 51 one on each side of the large pelleting wheel 12, and the axis 46 of the small pelleting wheel projects through the central openings 28 and 33 in the side flanges 37 and 39.

The small pelleting wheel 14 is biased generally radially outwardly against the large pelleting wheel 12 at the pelleting zone by linkages at each side of the pelleting wheels, including a bracket 52 fixedly mounted at the top of each arm 50, a link 54 extending from pin 53 on the carrier 45 and a rearwardly extending lever 55 connected with the link and bracket. The lever 55 is pivotally connected at one end thereof with the link 54 and the bracket 52 intermediate its ends such that raising the rear end of the lever tends to force the axis 46 of the small pelleting wheel rearwardly to force the wheel against the large pelleting wheel directly opposite the peripheral rolls 44, 44. The pin 53 attaching the links 54 to the roll carrier 45, also passes through the frame portion 41 on each side of the large pelleting wheel 12 to support the pressure linkage assembly. Inasmuch as the rolls 44, 44 are mounted in the carrier 45 rather than in the frame portion 41, the heavy loading resulting from biasing the small pelleting wheel 14 against the large pelleting wheel 12 is largely isolated from the frame.

A pair of single acting, extensible hydraulic cylinders 56, 56 extending between the frame portion 41 and the free end of the lever 55 serve to bias the small pelleting wheel 14 against the large pelleting wheel 12, and the lever 55 multiplies the force exerted by the cylinders.

A strut 117 projecting from the carrier 45 at each side of the large pelleting wheel 12 engages the pin connecting the lever 55 with the bracket 52 to limit movement of the small pelleting wheel 14 towards the large wheel 12 and permit the entire linkage for urging the two wheels together to be maintained under load without the wheels being pressed into contact of the confronting peripheral surfaces 38 and 49, even though no hay is at the pelleting zone.

Pressure is applied to the hydraulic cylinders 56, 56 by an accumulator 110 mounted at the rear of the upright portion 41 of the frame. The accumulator 110 maintains a more or less uniform, controlled pressure within the cylinders 56 so as to urge the pelleting wheels together at a more or less constant pressure, determined by the degree of pressure in the accumulator. The accumulator is charged by a hydraulic line 111 extending forwardly to the tractor, where it can be connected to a source of pressure in the tractor hydraulic system. The accumulator 110 having been charged, ordinarily the pressure within the accumulator will be retained and it is not necessary to take more hydraulic power from the tractor unless it is desired to increase the pressure within the accumulator. If desired, at the close of the day's pelleting, pressure in the accumulator can be reduced.

A feed roller 57 is positioned adjacent the end of the auger 30 to receive the crop from the end of the auger, compress it against the rotating inner face of the outer flange 37 of the large pelleting wheel and, together with the outer flange, aid in feeding the continuous mat of compressed hay between the flanges 37 and 39 and to the pelleting zone. The feed roller 57 is cylindrical and has a longitudinally ribbed or otherwise roughened surface for more aggressiveness, the roll being mounted on an axis extending generally radially of the small pelleting wheel 14 and the roll extending for most of the distance between the periphery of the small pelleting wheel and the margin of the opening 33 in the flange 39.

The feed roller 57 is supported on a pair of arms 59, 59 which are carried by a pair of brackets 60, 60 supported from a portion of the frame 17. A shaft 61, which also serves to drive the feed roller 57, as will be explained, serves as a pivot for the arms 59, 59.

The feed roller 57 is biased towards the outer flange 37 by a compression spring 58 contained within a tubular member 63 mounted on the upright frame portion 41 and the roller support arm 59 of the roller. A threaded rod 68 and nut 68' connected at one end to the lower feed roller arm 59 and slidably received within the outer end of the member 63 limits movement of the feed roller 57 towards the flange 37 so that the roller is kept from bearing directly against the flange.

A flat plate 73 lying in the plane of the inner flange 39 of the large pelleting wheel 12 extends from the feed roller 57 towards the pelleting zone to confine the mat of hay after compression by the feed roller and before the entire cross section of the mat is forced between the flanges 37 and 39 by the converging confronting surfaces 38 and 49 of the pelleting wheels. The plate 73, which is stationary, being supported from the upright portion 41 of the frame, has one edge 73' fitting closely along the edge of the opening 33 in the flange 39, and the plate closely overlaps the periphery of the small pelleting wheel 14 and extends towards the pelleting zone at least to the area where the periphery of the small pelleting wheel 14 enters between the flanges 37 and 39 of the large wheel.

Drive mechanism

The drive mechanism of the pelleter includes a gasoline engine 16 which is mounted in the frame 17 and which, through a clutch 62 and a reduction gear 64, drives a shaft 65 extending transversely of the machine by means of a roller chain 66. The shaft 65 is journaled in a portion of frame 17 and, driving through a pair of roller chains 67, 67, drives a shaft 78 journaled in bearings received within the cylindrical portions 51, 51.

The large outer pelleting wheel 12 is driven from the shaft 78 by means of a sprocket 74 and a roller chain 69 engaged with a large sprocket 70 bolted or otherwise secured to the outer side (away from the auger 30) of the wheel. The smaller, inner pelleting wheel 14 is driven from the shaft 78 by a sprocket 75 and a roller chain 71 engaged with a sprocket 72 bolted or otherwise secured to the exposed face of the wheel (see FIGS. 4 and 7). The sprockets 74 and 75 for driving the roller chains 69 and 71 respectively and the sprockets 70 and 72 are of such size as to drive the small inner wheel 14 at a more rapid angular velocity, the linear velocity of the periphery of the inner wheel equaling the velocity of the inner surface 38 of the rim 36 of the outer wheel. The large wheel 12 rotates on a fixed axis and therefore center distance between the drive sprockets 70 and 74 remains uniform. Inasmuch as the axis of the small wheel 14 oscillates about the shaft 78 from which the wheel is driven, the center distance between the drive sprockets 72 and 75 remains uniform despite movement of the axis of the small wheel. A shield 76 may be located immediately above the upper portion of the roller chain 71 to prevent dirt and scraps of hay from dropping on the chain.

An extension 65' of the shaft 65 extends beneath the engine 16 and is driven from the shaft 65 through a coupling 77. This shaft, through a V-belt 79 and pulleys 80 and 81, drives the feed auger 30. This shaft, through a second V-belt 82 and pulleys 84 and 85, drives a sprocket 89 journaled on shaft 34. A drive chain 87, driven by sprocket 89, drives the pickup cylinder through a sprocket 90 mounted on the shaft 25. Arms 91, 91 located one at each end of the pickup cylinder are pivotally mounted for rotation on the axis of shaft 34 and permit the pickup cylinder 21 to be raised and lowered without affecting the tension of chain 87. The feed roll 57 is driven from the shaft 65 through a sprocket 112 and chain 113 which drives sprocket 114 on a right-angle-drive gear box 92 mounted on a portion of the frame 17 and connected with the shaft 61. A drive chain 115 drives the feed roll 57 from the shaft 61.

In operation of the machine of the present invention, a windrow of hay is picked up in the customary manner by the pickup 11 as the machine moves down the field. As the windrow is deposited onto the feed table 26 by the spring tines 24 of the pickup, the feed auger 30 moves the hay in a steady stream lengthwise of the feed table in a direction axially of the pelleting wheels 12 and 14, beyond the free end 94 of the auger and against the inside surface of the outside flange 37 of the large pelleting wheel. Preferably, a rounded sheet metal guide 95 is provided forwardly adjacent the end of the auger to help guide the crop through the axial opening 33 in the inside flange 39. The rear wall 29 of the feed table terminates immediately adjacent the small pelleting wheel 14 and the end portion 96 of the rear wall may be inclined forward slightly to guide the crop into the space between the inner and outer pelleting wheels generally diametrically opposite the pelleting zone.

The crop is carried from the end 94 of the auger downwardly between the pocketed peripheral surface 49 of the inner pelleting wheel and the rim 36 of the outer pelleting wheel and in contact with the spring-pressed feed roller 57 which presses the hay against the flange 37 of the large pelleting wheel, more or less compressing the hay into a mat. The feed roller 57 is driven at a peripheral speed which is preferably approximately equal to the peripheral speed of the rim 36 of the outer pelleting wheel to aid in feeding the compressed mat of hay in a steady stream to the pelleting zone centered at the point of tangency of the inner and outer pelleting wheels 12 and 14, at which pelleting occurs. The feed roller 57 compresses the mat of hay to a thickness somewhat thinner than the space between the flanges 37 and 39 of the outer pelleting wheel to facilitate entrance of the edges of the mat between the flanges. The feed roller 57 and the flanges of the large wheel 12, particularly flange 37, carry the mat of hay rearwardly towards the pelleting zone and oppose any tendency of the hay to extrude reversely due to pressure of the pelleting wheels.

After the compressed mat of hay has left the feed roller 57, it is gradually compressed between the converging peripheries of the outer and inner pelleting wheels 12 and 14. As the mat moves towards the pelleting zone at the point of tangency of the two pelleting wheels, it is compressed at a direction at right angles to the initial compression by the feed roller 57, thus aiding in the intertwining of the hay. It has been found that a pelleting pressure of about 3,000 pounds per square inch to 5,000 pounds per square inch is desirable for pelleting hay into self-containing cakes or pellets. The axially extending wedge-like portions 48 formed by the intersection of adjacent pockets of the peripheral surface 49 of the inner wheel 14 exert a high degree of pressure and wedging action on the hay at the point of tangency so as to largely crush the fibers at spaced intervals and tend to separate or wedge apart the individual pellets or cakes. This separating action is aided by stretching of the mat of hay as it is forced radially outwardly against the surface of the large pelleting wheel during compressing and pelleting.

As the pellets or cakes leave the point of tangency of the pelleting wheels, the high degree of pressure to which they have been subjected leaves them wedged between the flanges 37 and 39 of the outer pelleting wheel 12 so that they are held by these flanges until separated and withdrawn from the pockets of the inner pelleting wheel by the scraper. The pellets are then carried upwardly between the flanges of the outer wheel 12 until they reach a spring steel scraper 97 extending between the flanges of the outer pelleting wheel and bearing against the inner surface of the rim 36 at the top of the wheel. As the wheel is rotated, the scraper forces the pellets downwardly from between the flanges where they fall into the upper end of a chute 99 extending laterally from between the flanges and downwardly forwardly beside the outer pelleting wheel 12. The scraper 97 not only removes the pellets from between the flanges 37 and 39 of the outer pelleting wheel, but also tends to separate the pellets along the transverse line of weakness formed by the inner pelleting wheel in the event that the pellets have not already been separated. In addition, the scraper cleans out any residue or gum which tends to adhere to the inner surfaces of the rim and flanges.

The chute 99 discharges the pellets by gravity into a hopper 100 located in front of the upright frame portion 41 of the machine. The hopper 100 in turn discharges by gravity into a wagon elevator 15 which moves rearwardly upwardly to drop the pellets into a wagon towed behind the pelleter. The elevator 15 is similar to a conventional wagon elevator for a corn picker, consisting of one or more endless chains 102 carrying transverse elements or flights 104 for carrying the pellets upwardly along a rearwardly inclined open topped metal channel 105 positioned beside the pelleting wheels. The chains 102 are driven from a shaft 86 which is driven by a belt 101 from a shaft 116 extending from the right-angle-drive gear box 92. If desired, a clutch can be included in the elevator drive to permit the elevator drive to be interrupted when turning at the end of a windrow so that pellets will not be dropped from the rear of the elevator when the wagon is not below the end of the elevator to receive them.

A pocket cleaning scraper blade 107 located a short distance above the free end 94 of the auger is mounted on a U-shaped support 109 pivoted on a horizontal axis on the end portion 96 of the rear wall of the feed table and spring-pressed by spring 108 to ride against the peripheral pocketed surface 49 of the inner wheel 14 so as to remove any hay or gum which may tend to remain within the pockets.

One of the cakes or pellets formed by the machine of the present invention is shown in FIGURE 9 of the drawings. This pellet is formed of hay which has been intertwined by the initial compression of the stream of hay passing through the machine into a mat between feed roller 57 and the flange 37 and then by compression at right angles to the first compression to crush the hay and cause the resins and juices present to bind the hay into a self-sustaining cake or pellet. The ends 119 and 120 of the pellet extend transversely of the stream of hay being compressed between the pelleting wheels and are formed as areas of weakness in the stream of compressed hay by the generally wedge-like portions 48 extending transversely of the small pelleting wheel. The end surfaces 119 and 120 lie in generally parallel planes which are inclined somewhat to the general plane of the faces of the pellets, as indicated in the drawings. The face of the pellet formed against the surface 38 of the large pelleting wheel is generally flat, while the opposite face of the pellet, formed against the pocketed peripheral surface 39 of the small inner wheel is longitudinally arched somewhat, the pellet being compressed to a greater degree adjacent the end surfaces 119 and 120.

We claim:

1. In a field pickup hay pelleter, an outer pelleting wheel mounted for rotation on a fixed, generally horizontal axis extending generally transversely to the direction of movement of the pelleter across a field, said outer wheel having a circular rim portion and a pair of radially, inwardly extending side flanges lying in spaced, parallel planes, the rim portion having a smooth, generally cylindrical inner surface extending between the side flanges, an inner pelleting wheel lying in the plane of and inside the outer wheel, mounted for rotation on an axis oscillatable towards the rim portion of the outer wheel and having a rim portion adapted to fit closely between the flanges of the outer wheel, the inner wheel having a peripheral surface confronting the cylindrical surface of the outer wheel and provided with a series of adjacent pockets separated by wedge-like, axially extending portions, the inner wheel being biased toward the outer wheel at a fixed pelleting zone, means for driving both pelleting wheels at substantially the same peripheral velocity, means for picking up a windrow of hay, and means for feeding the hay axially of the wheels into the space between the inner and outer wheels in advance of the pelleting zone.

2. In a field pickup hay pelleter, an outer pelleting wheel mounted for rotation on a fixed, generally horizontal axis extending generally transversely to the direction of movement of the pelleter across a field, said outer wheel having a circular rim portion and a pair of radially, inwardly extending side flanges lying in spaced, parallel planes, the rim portion having a smooth, generally cylindrical inner surface extending between the side flanges, an inner pelleting wheel lying in the plane of and inside the outer wheel, mounted for rotation on an axis oscillatable towards the rim portion of the outer wheel and having a rim portion adapted to fit closely between the flanges of the outer wheel, the inner wheel having a peripheral surface confronting the cylindrical surface of the outer wheel and provided with a series of adjacent pockets separated by wedge-like, axially extending portions, the inner wheel being biased toward the outer wheel at a fixed pelleting zone, means for driving both pelleting wheels at substantially the same peripheral velocity, means for picking up a windrow of hay, and an auger extending parallel to the axis of the pelleting wheels behind the hay pickup and having a free end terminating adjacent the space between the inner and outer pelleting wheels in advance of the pelleting zone, the auger having a spiral flight extending throughout its length for delivering hay from the hay pickup axially of the pelleting wheels.

3. In a hay pelleter, a pair of co-planar wheels having opposed pelleting surfaces, including an outer pelleting wheel rotatable on a fixed axis and having a rim portion provided with a smooth inner surface and a pair of radially inwardly extending side flanges having confronting parallel surfaces, at least one of the flanges extending only part of the distance to the axis of the wheel to provide an axial opening, and an inner pelleting wheel mounted for rotation on an axis within the outer wheel and with its periphery generally tangent to the inner surface of the rim portion, the inner wheel having a peripheral zone provided with parallel, radially extending side surfaces and having a continuous series of peripheral pockets extending between the side surfaces of the wheel, adjacent pockets being separated by axially extending wedge-shaped portions formed by the intersection of adjacent pocket walls, the pocketed peripheral portion of the inner wheel fitting closely between the flanges of the outer wheel.

4. A hay pelleter as claimed in claim 3, in which both pelleting wheels are driven at substantially the same peripheral speed.

5. A hay pelleter as claimed in claim 4, in which the outer pelleting wheel is mounted for rotation on a fixed axis and the inner pelleting wheel is supported on an axis movable towards the periphery of the outer wheel along an arcuate path and is biased towards said periphery at a fixed pelleting zone by a hydraulic cylinder.

6. A hay pelleter as claimed in claim 5, in which one of the side flanges of the outer pelleting wheel extends radially inwardly further than the other and hay to be pelleted is fed into the space between the wheels through the axial opening in the flange of lesser extent and against the other flange.

7. A hay pelleter as claimed in claim 6, in which the hay to be pelleted is fed into the space between the wheels generally diametrically opposite the pelleting zone.

8. A hay pelleter as claimed in claim 7, in which a feed roller rotating on an axis generally parallel to the plane of the flanges and located between the zone at which the hay is fed between the wheels and the pelleting zone compresses the hay against the flange of greater radial extent.

9. A hay pelleter as claimed in claim 8, in which the feed roller is driven in a direction to move the hay toward the pelleting zone.

10. A hay pelleter as claimed in claim 9, in which the axis of the feed roller extends generally radially of the inner pelleting wheel and the roller extends between the periphery of the inner pelleting wheel and the inner edge of the radial flange of lesser extent of the outer wheel.

11. A hay pelleter as claimed in claim 10, having a feed table, means for picking up a windrow of hay and depositing it on the feed table, and an auger positioned immediately above the feed table for moving hay along said feed table, the axis of the auger being parallel to the general plane of the feed table and generally perpendicular to the plane of the pelleting wheels and the auger terminating in an open end adjacent the zone at which the hay is fed between the pelleting wheels.

12. A hay pelleter as claimed in claim 8, in which an open ended feed auger extends generally perpendicular to the plane of the pelleting wheels, the open end of the auger terminating adjacent the zone at which hay is fed between the wheels.

References Cited in the file of this patent

UNITED STATES PATENTS

| | | |
|---|---|---|
| 1,265,206 | Jenkins | May 7, 1918 |
| 2,229,143 | Stacom | Jan. 21, 1941 |
| 2,715,871 | Dosne et al. | Aug. 23, 1955 |
| 2,716,318 | Skromme | Aug. 30, 1955 |